United States Patent [19]
Caraway

[11] Patent Number: 5,421,148
[45] Date of Patent: Jun. 6, 1995

[54] CROP HARVESTING METHOD AND APPARATUS

[76] Inventor: John P. Caraway, P.O. Box 1619, Lake Wales, Fla. 33853

[21] Appl. No.: 222,416

[22] Filed: Apr. 1, 1994

[51] Int. Cl.$^6$ .................... A01D 46/24; A01D 91/04
[52] U.S. Cl. .................... 56/328.1; 56/329; 56/DIG. 2; 406/106; 406/198
[58] Field of Search .......... 56/328.1, 329, 332, 56/DIG. 2; 406/106, 108, 154, 197, 198

[56] References Cited

U.S. PATENT DOCUMENTS

| | | | |
|---|---|---|---|
| 2,535,542 | 12/1950 | Lehman et al. | 56/328.1 |
| 2,602,279 | 7/1952 | Leighton | 56/329 |
| 2,698,508 | 1/1955 | Hollister | 56/332 |
| 3,138,912 | 6/1964 | Mays et al. | 56/328.1 |
| 3,704,576 | 12/1972 | Quick | 56/330 |
| 4,015,366 | 4/1977 | Hall, III | 56/328.1 X |
| 4,199,913 | 4/1980 | Hood et al. | 53/244 |
| 4,228,870 | 10/1980 | Beardsley | 182/127 |
| 4,435,950 | 3/1984 | Deux et al. | 56/330 |
| 5,205,121 | 4/1993 | de Morais Zoio et al. | 56/328.1 |

OTHER PUBLICATIONS

Whitney & Harrell "Status of Citrus Harvesting in Florida" 42 J. Agric. Eng'gr. 285–299.

"Citrus Harvesting—How Can It Be Improved" Florida Grower & Rancher 10 (undated) (1989).
Heddon, et al. "Trunk Shakers for Citrus Harvesting—Part II 4(2) Appl Eng'g in Agric 102 (Jun. 1988) Tree Growth, Fruit Yield and Removal".
Agricultural Machines Inc. Lit. on "Pic-Rig" Picker (Oct. 1993).
Mongoose Harvesting Systems Advertising Handout (undated).

Primary Examiner—David J. Bagnell
Attorney, Agent, or Firm—Warren L. Franz; James H. Beusse

[57] ABSTRACT

Tree crops such as citrus fruit is harvested by a mechanical picker by advancing a series of rotating disks into the tree where the disks engage the fruit and pull it from the tree. The picker includes a housing having wheels for movement between rows of trees with a drive gearing assembly in the housing powered from a tractor. Two disk assemblies, each comprising a pair of longitudinally spaced elongated support arms having inside ends supported on the housing, have outside ends supporting a shaft extending longitudinally between the support arms. The disks are arranged in pairs at longitudinally spaced intervals along the shaft with adjacent disks of each pair having oppositely facing surfaces. The arms can be raised and lowered to force the disks into the tree canopies from top to bottom of the trees.

22 Claims, 5 Drawing Sheets

CROP HARVESTING METHOD AND APPARATUS

This invention relates generally to methods and apparatus for harvesting crops; and, in particular, to methods and apparatus especially suitable for separating fruit crops from trees so that the fruit is gathered without contacting the ground.

BACKGROUND OF THE INVENTION

Despite the availability of mechanical picking aids to increase picker productivity, manual labor remains the dominant method of picking citrus and similar tree crops. Efforts at replacing traditional methods with mass removal mechanical systems have been slow, primarily because their economic justification under current labor conditions continues to be questionable. See, J. Whitney & R. Harrell, "Status of Citrus Harvesting in Florida," 42 J. Agric. Eng'g. Res. 285-299 (1989). For deciduous crops, the use of abscission chemicals to loosen the fruit has been tried to make mechanical harvesting more efficient. However, because chemical fruit loosening causes considerable preharvest drop, systems were developed to remove fruit to the ground and to pick up mechanically. Id. at 291. This has led to problems with fruit quality.

For processed fruit, the main concerns relate to contamination picked up from the soil. In addition to sand that has to be removed from fruit which has contacted the ground, there is concern about microflora which penetrate abraded skin and cause a decay problem, especially in unpasteurized juice. The decay level is about three times as high on ground fruit as for fruit which is hand-picked and placed in the bag. "Citrus Harvesting—How Can It Be Improved?," Florida Grover and Rancher 10.

Past approaches to tree crop harvesting systems include the use of limb, air or trunk shakers to shake the trees to remove fruit to the ground, with or without the aid of chemicals, followed by the use of machines to gather, pick up and load the dropped fruit. Examples of such systems are disclosed in U.S. Pat. Nos. 4,435,950 and 4,199,913. Use of trunk shakers has been limited for citrus in some instances, however, because of poor fruit removal, undesirable bark damage, and inadequate tree trunk height for good shaker clamp attachment. See, S. Heddon, et al., "Trunk Shakers for Citrus Harvesting—II: Tree Growth, Fruit Yield and Removal," 4(2) Applied Eng'g in Agriculture 102 (June 1988). Limb and air shakers do not have the same bark removal and trunk height problems, but may cause limb damage. Of particular concern, also, is the fact that shakers are nondiscriminatory, so may cause unacceptable damage to the next year's crop.

Various mechanical separating devices which contact the fruit itself have been tried. One approach uses a bank of flexible, rotating augers inserted into the tree canopy to twist and pull the fruit out of the tree. Another utilizes a soft, gummy rotating cuff attached to the end of a hollow lightweight vacuum tube. The vacuum pulls the fruit into contact with the cuff, which spins to separate the fruit from the tree. The fruit is then sucked through a central hole and into the tube for gathering.

The Pic-Rig TM mechanical citrus picker, marketed by Agricultural Machine Inc., Sebring, Fla., has a bank of bars with picking hooks that extend into the tree canopy, and pull fruit off when they retract. To prevent branch damage, spring tension on the hooks releases them when they meet resistance. The Mongoose TM B-300 picker, marketed by Mongoose Harvesting Systems, Arcadia, Fla., consists of a round basket mounted on the end of a citrus highlift. A curved rod rotates inside the top of the basket to remove fruit caught in openings of a protective cage. The picked fruit collects in the bottom of the basket which opens like a clam shell for emptying.

Other relevant background is given in U.S. Pat. Nos. 3,704,576; 5,205,121; 4,435,950; 4,199,913; and 4,228,870.

U.S. Pat. No. 3,704,576 discloses a machine for picking up fruit after it has been stripped from the tree. The fruit is transported to a waiting truck for transport to a distribution point. U.S. Pat. No. 5,205,121 discloses a complex method of vacuum and human manipulation of screens for extracting fruit from trees. Fruit is collected in netting, then packaged and transported to a distribution center in a complicated and slow harvesting process. U.S. Pat. No. 4,435,950 discloses a complicated arrangement of spoked extrusions which are used to part tree branches for picking. Tree height limitations would, however, make this approach impractical for harvesting citrus fruits. U.S. Pat. No. 4,199,913 discloses a system wherein a machine is used to grade fruit by size, before loading and transporting the fruit to the distribution center. And, U.S. Pat. No. 4,228,870 discloses a system of platforms which surround the tree, to provide walking surfaces for the harvesters. The pickers stand on the platforms, and pick the fruit.

SUMMARY OF THE INVENTION

It is an object of the present invention to provide a system for harvesting tree crops or the like, whereby fruit or other tree crops can be efficiently and cost-effectively mechanically separated from the tree.

It is another object of the invention to provide a system for harvesting tree crops or the like, whereby fruit or other crops separated from the tree, can be efficiently and cost-effectively gathered, without contacting the ground.

It is yet another object of the invention to provide a system for harvesting tree crops or the like, that includes means for collecting harvested fruit automatically and efficiently to a common collection point.

In an exemplary implementation of a citrus fruit crop harvesting system, described in greater detail below, an abscission chemical is first applied to the trees for loosening the fruit. The fruit is then separated by a mechanical picker, which employs a series of rotating disks which are advanced into the tree. Alternatively, the fruit can be shaken or blown from the tree, using conventional mechanical separators. The picked fruit falls onto underlying netting, and is gravitationally moved to a discharge opening from which it empties into an underground network of piping located throughout a grove. Water pumped through the piping then carries the fruit from the vicinity of the trees to a central catch basin. The gathered fruit is then elevated from the catch basin to a holding tank hopper, from whence it is loaded onto a truck or train for transportation to a remote distribution center.

The network of pipes is installed underground between adjacent rows of trees, throughout the grove. A series of shut-off valves is included, to control flow so that water can be flowed to the catch basin from a particular row of trees being harvested, while closing off water flow from other rows. The water may include chemicals for cleaning the fruit as it is being carried through the piping. The cleaning chemicals can include anti-fungal solutions, if desired.

The invention provides a method and apparatus for the complete harvesting of tree crops, which provides for automatically picking the crop from the tree, automatically gathering the crop without contacting the ground, automatically moving the crop to a central gathering point, and automatically loading it for transportation to a remote distribution center.

BRIEF DESCRIPTION OF THE DRAWINGS

Embodiments of the invention have been chosen for purposes of illustration and description, and are shown in the accompanying drawings, wherein.

Throughout the drawings, like elements are referred to by like numerals.

DETAILED DESCRIPTION OF PREFERRED EMBODIMENTS

The principles of the invention are illustrated, by way of example, with reference to a crop harvesting system employed in a citrus fruit grove of the type found in Central and South Florida. It will be appreciated, however, that the principles described also find application in other geographical regions, and in connection with harvesting other fruit and non-fruit crops.

Figure 1:
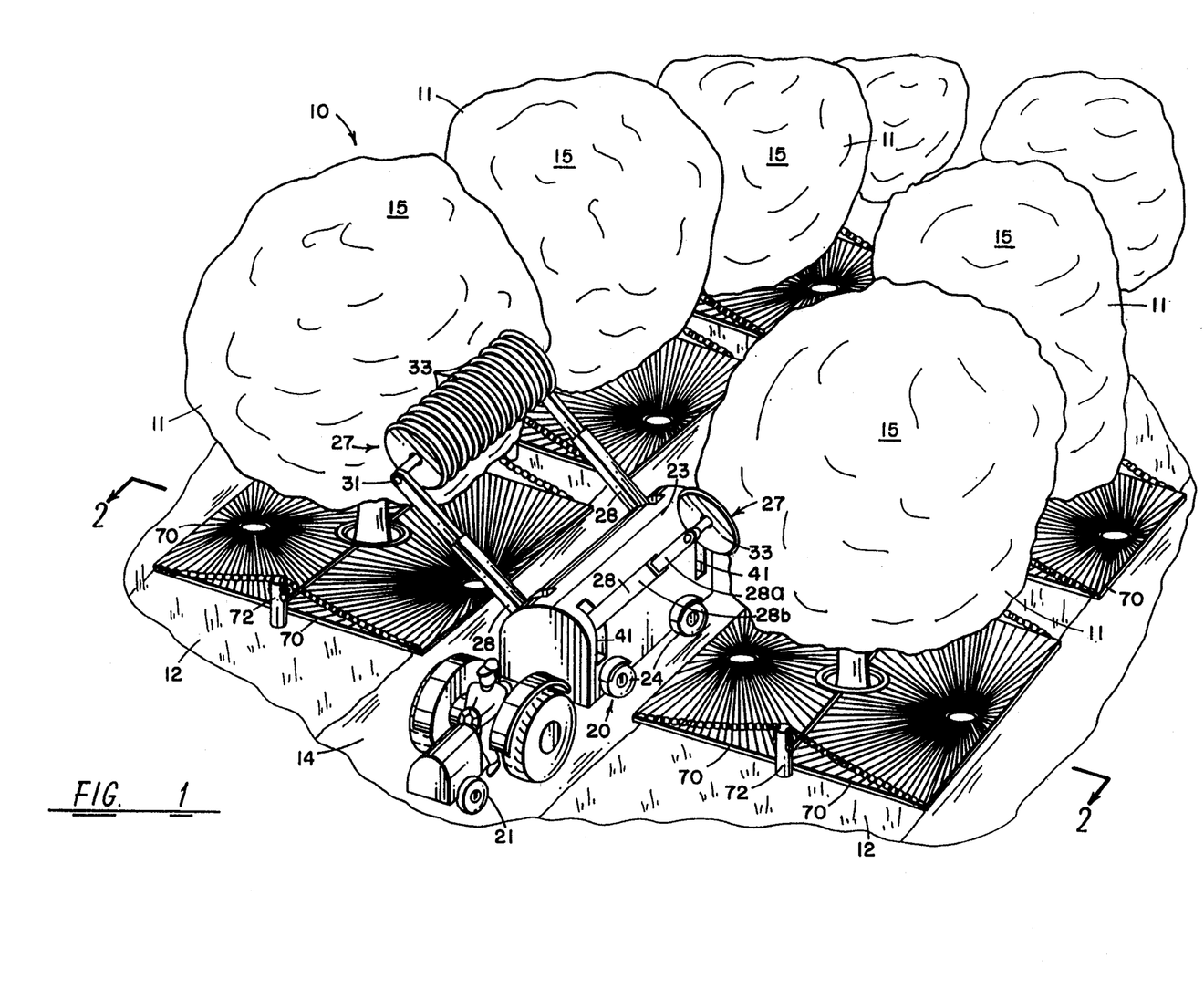
FIG. 1 is an overall view of a citrus fruit grove employing a crop harvesting system in accordance with the invention.
Figure 2:
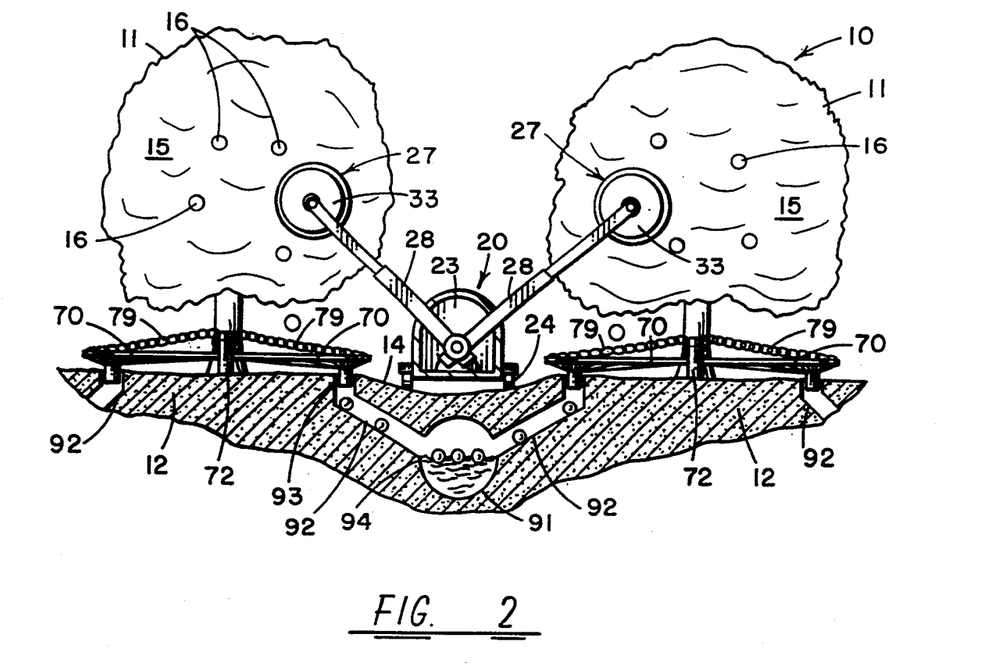
FIG. 2 is a section view taken along the lines 2—2 of FIG. 1.

As shown in FIGS. 1-2, the grove 10 is planted with trees 11 arranged in longitudinally aligned rows in beds 12 separated by likewise longitudinally extending gaps 14. Gaps 14 serve as pathways along which tractors and other agricultural equipment used in cultivation and harvesting can travel. Trees 11 are planted at longitudinally spaced intervals, centrally of the beds, and have laterally extending foliage canopies 15 that bear fruit 16. In a typical implementation, beds 12 are elevated relative to pathways 14, so water drains away from trees 11.

A mechanical picker 20, towed as an attachment to a conventional tractor 21, comprises a housing 23 having wheels 24 for movement between the rows of trees 11 along the pathways 14. Housing 23 contains a drive gearing assembly 25 (FIG. 4), driven by power supplied by a tractor power take-off (PTO) unit through a universal telescoping drive shaft. Picker 20 includes a plurality of picking disk assemblies 27, each of which comprises a pair of longitudinally spaced elongated support arms 28 having inside ends supported on housing 23, and outside ends 31 (FIG. 4) between which a bank 32 of rotating disks 33 are ganged.

Figures 4, 5:
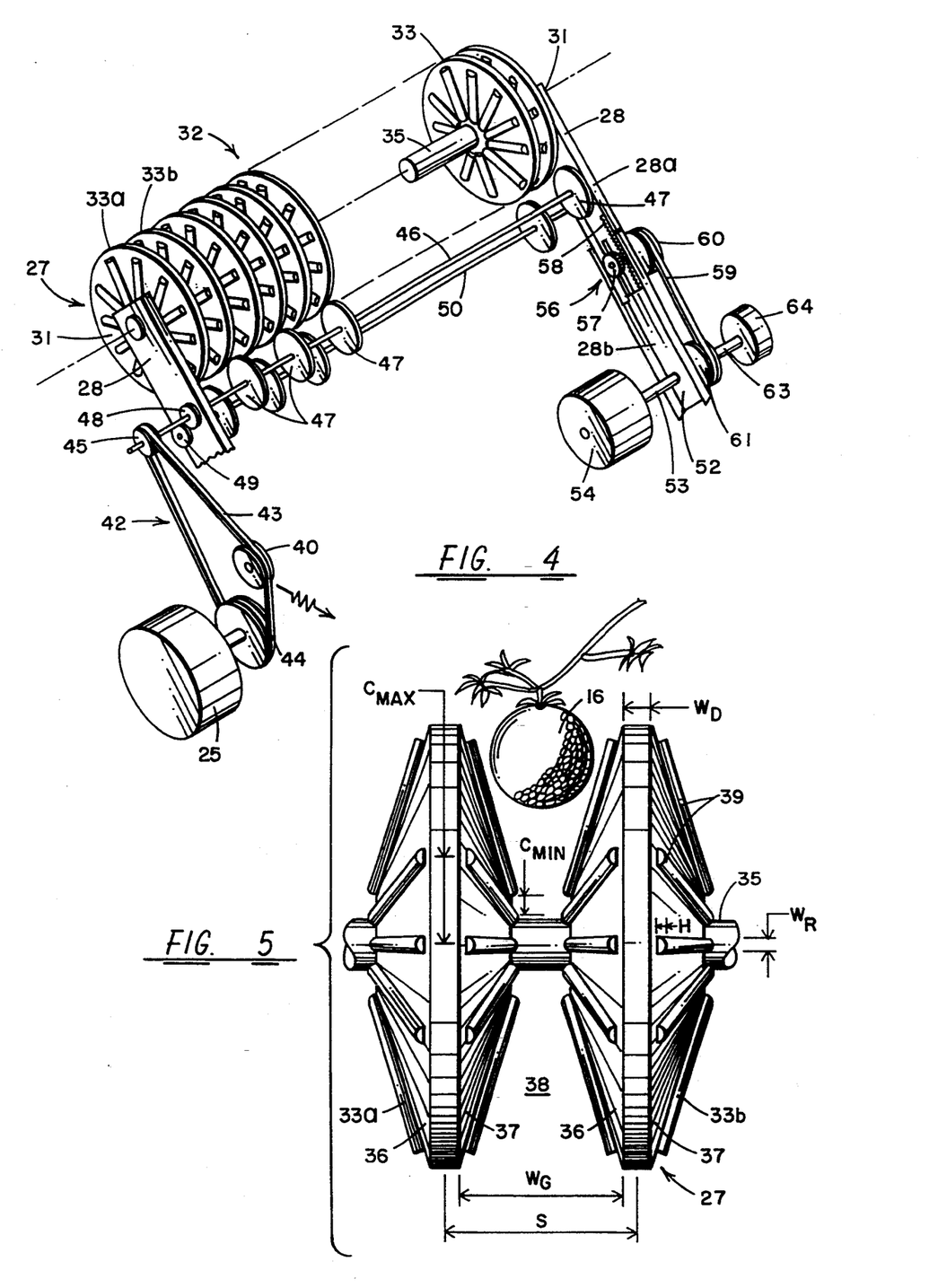
FIG. 4 is a schematic perspective view of the drive components of the picker apparatus of FIGS. 1-3.
FIG. 5 is a fragmentary view of the disk assembly of the picker of FIG. 3.

Disk assemblies 27 are configured as shown in FIGS. 4-5, with disks 33 arranged at longitudinally spaced intervals, in pairs 33a, 33b, along a longitudinally extending shaft 35. Disks 33 are generally elliptical in cross-section, having oppositely facing round concave surfaces 36, 37. The spacing defines hyperbolic cross-sectioned gaps 38 between facing surfaces 36 and 37 of disks 33a, 33b (FIG. 5). Disks 33 are configured, dimensioned and spaced to give an outside gap dimension that is smaller than the diameter of a piece of mature fruit 16, but larger than the diameter of a piece of immature fruit (viz. fruit identified with a future harvest). The disk surfaces 36, 37 are arrayed with spoke-like, radially directed ribs 39 preferably formed of a hard rubber.

An envisioned preferred embodiment utilizes eighteen disks 33 arranged on shafts 35 having 5' lengths, with disks 33 set at 6" center-to-center spacings S (FIG. 5). Disks 33 have 2" widths $W_D$ in the longitudinal direction at their peripheries, providing a gap width $W_G$ at the periphery of 4". Ribs or teeth 39 are rounded, arcuate cross-sectional hard rubber members having $\frac{1}{2}$" heights H at their centers, and 1" widths $W_R$ throughout their lengths. Ribs 39 are circumferentially spaced at $3\frac{1}{2}$" at their points of furthest separation $C_{MAX}$ and 1" at their nearest points of separation $C_{MIN}$. The diameters of disks 33 and lengths, number and placements of ribs 39 are chosen according to intended application and individual preferences.

FIGS. 1 and 2 illustrate a picker 20 having two disk assemblies 27 mounted on sets of arms 28 respectively extended laterally through vertical slots 41 in opposite sides of housing 23. Slots 41 are configured so that arms 28 can be rotated at their inner ends from vertical positions raised above housing 23, downwardly through the tree canopies 15 toward horizontal positions, and back up again. To control penetration into the canopy during arm rotation, arms 28 have telescoping inner and outer portions 28a, 28b, for controlling the positioning of the disk assemblies 27 during travel through canopies 15.

FIG. 4 illustrates a chain drive arrangement 42 usable for driving the disk assemblies 27. The arrangement 42 includes belts or chains 43 driven by gearing assembly 25 for rotation of disks 33. Chain 43 mechanically interconnects on drive pulley 44 rotated by drive assembly 25, with a driven pulley 45 mounted to turn a primary drive shaft 46 journalled between arms 28. Drive wheels 47, mounted at longitudinally spaced intervals along shaft 46, have outside circumferential surfaces which contact the circumferential peripheries (at widths $W_D$) of odd numbered ones 33b of disks 33, for driving those disks in a clockwise or counterclockwise rotational direction as shaft 46 is rotated by chain drive arrangement 42. A gear 48 mounted on shaft 46 is in mesh with a like gear 49 mounted on a secondary drive wheel shaft 50 which is journalled between arms 28 in laterally spaced position relative to shaft 46. The meshing of gears 48, 49 functions to drive shaft 50 in counter-rotation to shaft 46. Drive wheels 51, mounted on shaft 50, have outside circumferential surfaces that contact the circumferential peripheral surfaces of even numbered ones 33a of disks 33, to drive the even numbered disks 33 in an opposite counterclockwise or clockwise direction to disks 33b. A spring-biased idler pulley 40, inserted in the chain coupling between pulleys 44, 45, ensures that chain tension is maintained for different telescopic extensions of arms 28. The disks will rotate in clockwise direction, a counterclockwise direction, or in opposite directions. The direction of the rotation will depend on the type of fruit to be harvested and the direction at which the fruit will need to be disconnected from the tree.

Arms 28 are attached at inner ends 52 for rotation with a shaft 53 of a drive gearing assembly 54. Assembly 54 serves to control the arcuate movement of disk assemblies 27 through canopies 15. Each pair of arms 28 may have a separate associated assembly 54, or mechanical linkage can be provided to drive multiple pairs of arms 28 in synchronism from a single assembly 54. Similarly, assembly 54 can be operated independently of disk rotation drive assembly 25, or can be mechanically linked to operate, with or without separate clutch control, in a common synchronized drive setup. Assemblies 25 and 54 may be configured to draw power from the tractor PTO, or may be powered with independent motor power.

Telescopic extension and retraction of arm portion 28a, relative to arm portion 28b can be provided using a track gearing mechanism 56, as illustrated in FIG. 4. As shown, external teeth of a gear 57 mounted for rotation on arm portion 28b are in mesh with internal teeth of a track gear 58 fixed on arm portion 28a. A belt or chain 59 extends between a first pulley 60, mounted on a common shaft with gear 57, and a second pulley 61 mounted on an output shaft 63 of a telescopic extension drive gearing assembly. The other arm 28 of each arm pair includes a like track gearing mechanism, coupled for synchronized drive to the same or a different assembly 64.

Drive assemblies 25, 54 and 64 are controlled and operated to place banks 32 in successive paths of travel through canopy 15 of a proximal tree 11, with tractor 21 moving longitudinally at a slow rate of speed along a pathway 14. As chains 43 are turned, shafts 46, 50 are rotated to rotate disks 33a, 33b in counterrotation, as shafts 53 turn to cause outside ends 31 of arms 28 to travel in arcs through canopies 15. Drives 64 turn chains 59 to control extension or retraction of arm portions 28a relative to arm portions 28b during the arcuate sweeps. Mature fruit 16 encountered in the journey (see FIG. 5) becomes positioned between adjacent, counterrotating disks 33a, 33b, and is rotated by ribs 39 to spin the fruit stem to separate encountered fruit 16 from its associated branch. Immature fruit 16 is, however, too small to contact ribs 39 of both facing disk surfaces 36, 37 simultaneously, so is not "picked." As fruit 16 becomes released through action of picker 20, it drops from the canopy into underlying fruit gathering equipment, described in more detail below.

Figure 3:
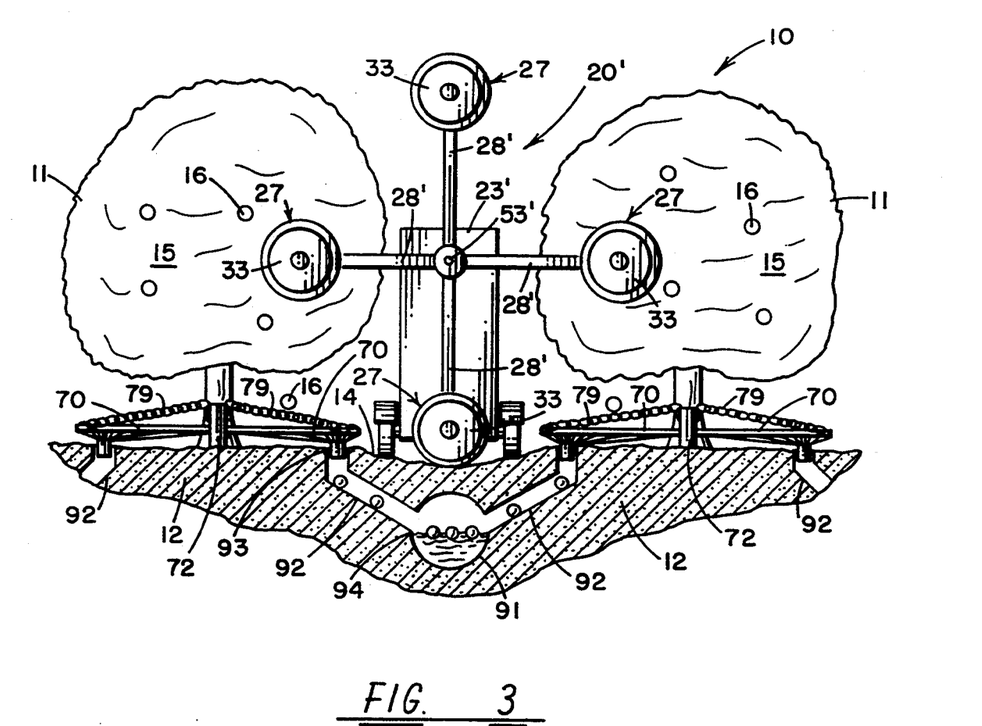
FIG. 3 is a view, as in FIG. 2, showing a modified form of the picker apparatus of FIGS. 1 and 2.

FIG. 3 illustrates a modified embodiment 20' of the picker 20 which has four disk assemblies 27 mounted at 90° angularly-spaced intervals about a common central shaft 53', for rotation on arms 28' in windmill fashion about a horizontal axis established by shaft 53' relative to a housing 23'. The illustrated arms 28' are not telescopic. Housing 23'and arms 28' are dimensioned, configured and adapted to place all banks 32 in succession within each canopy 15 as tractor 21 tows apparatus 20' along pathway 14.

Figure 6:
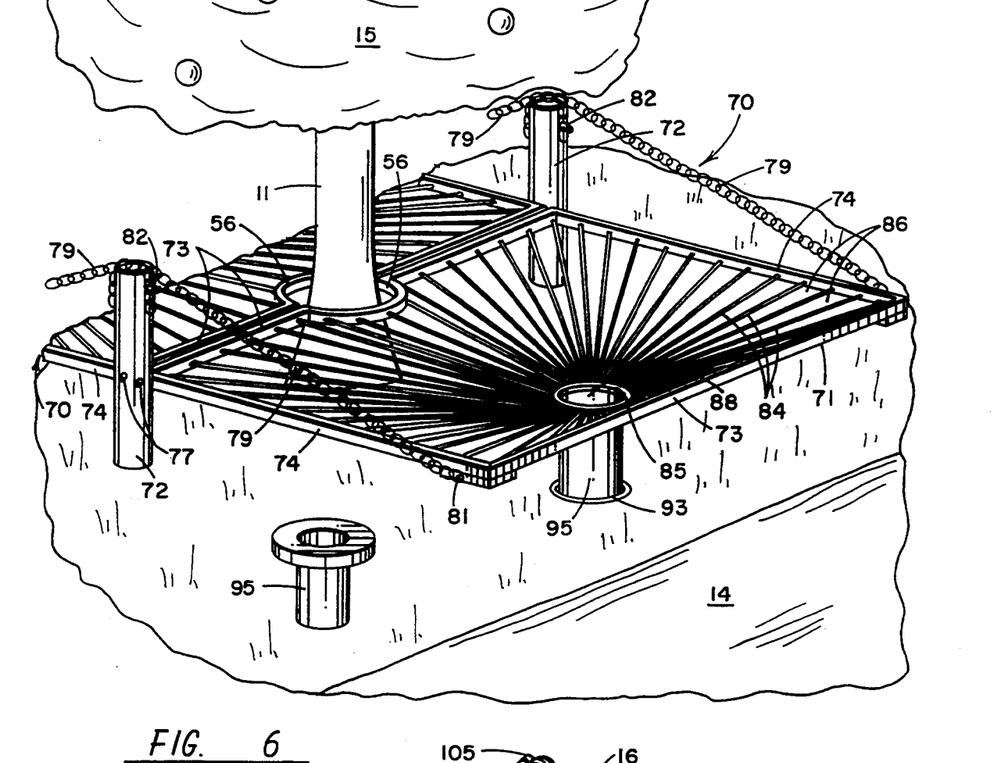
FIG. 6 is an enlarged perspective view of the fruit catching and channeling apparatus shown in FIGS. 1-3.

As shown in FIGS. 1-2 and 6, a pair of grills or nets 70 is located to encircle the trunk of each tree 11, below the full extent of canopy 15. Each net 70 comprises a rectangular framework 71 supported between a pair of longitudinally spaced posts 72. Each framework 71 has laterally spaced longitudinal members 73, joined at corners by longitudinally spaced lateral members 74. A front one of members 73 is located proximate the edge of pathway 14, underneath a corresponding forward-most portion of canopy 15. A rear one of members 73 is located generally coincident with a center line of the row of trees 11, and includes an arcuate divergence 76, defining a semi-circular cutout to accommodate the trunk of tree 11. Rear members 73 of each framework 71 of the pair of nets 70 are placed in neighboring parallel alignment, with the arcs 76 accommodating a respective different half of the tree circumference.

Each framework 71 is pivotally mounted between posts 72 by passage of longitudinal pins 77 through posts 72 and through respective members 74 at points proximate the trunk ends of members 74. Support for the front of framework 71, to counteract the moment about pivot pins 77, is provided by chains 79 which connect over the tops of posts 72 to points of attachment 81 located at the framework front corners. The angling of framework 71 about pins 77 is established by selectable connection of the rear ends of chains 79 to rear attachment points provided by hooks 82 on the sides of posts 72.

A multiplicity of runners 84 extend radially in spaced positions from points of attachment to members 73, 74 of framework 71, to points of attachment on a ring 85 located centrally in a forward portion of each net 70 at a decreased elevation relative to a horizontal plane of framework 71. Runners 84 are spaced to provide a grillwork having gaps 86 between runners 84. Gaps 86 are sufficiently small at their widest parts to prevent pieces of mature fruit 16 from falling between runners 84, but are sufficiently large to permit leaves, dirt and similar small debris encountered in the grove to fall or be washed through to the underlying ground, either without water or with water provided during normal rainfall or grove irrigation. Runners 84 are oriented down toward and joined to ring 85, to provide unobstructed converging tracks to catch and convey released fruit 16 down toward a central circular discharge opening 88 provided by the open interior of ring 85. Ring 85 is dimensioned, configured and adapted so that fruit 16 will be readily discharged from net 70 at point above, but not too far from, the ground level of the underlying bed.

The pivotal attachment of framework 71 between two posts 72 enables net 70 to be rotated upwards relative to its rear 73 for working on the beds. The upwardly pivoted orientation may be maintained by changing the point of attachment to shorten the length of chains 79 between attachment points 81 and 82.

Figure 7:
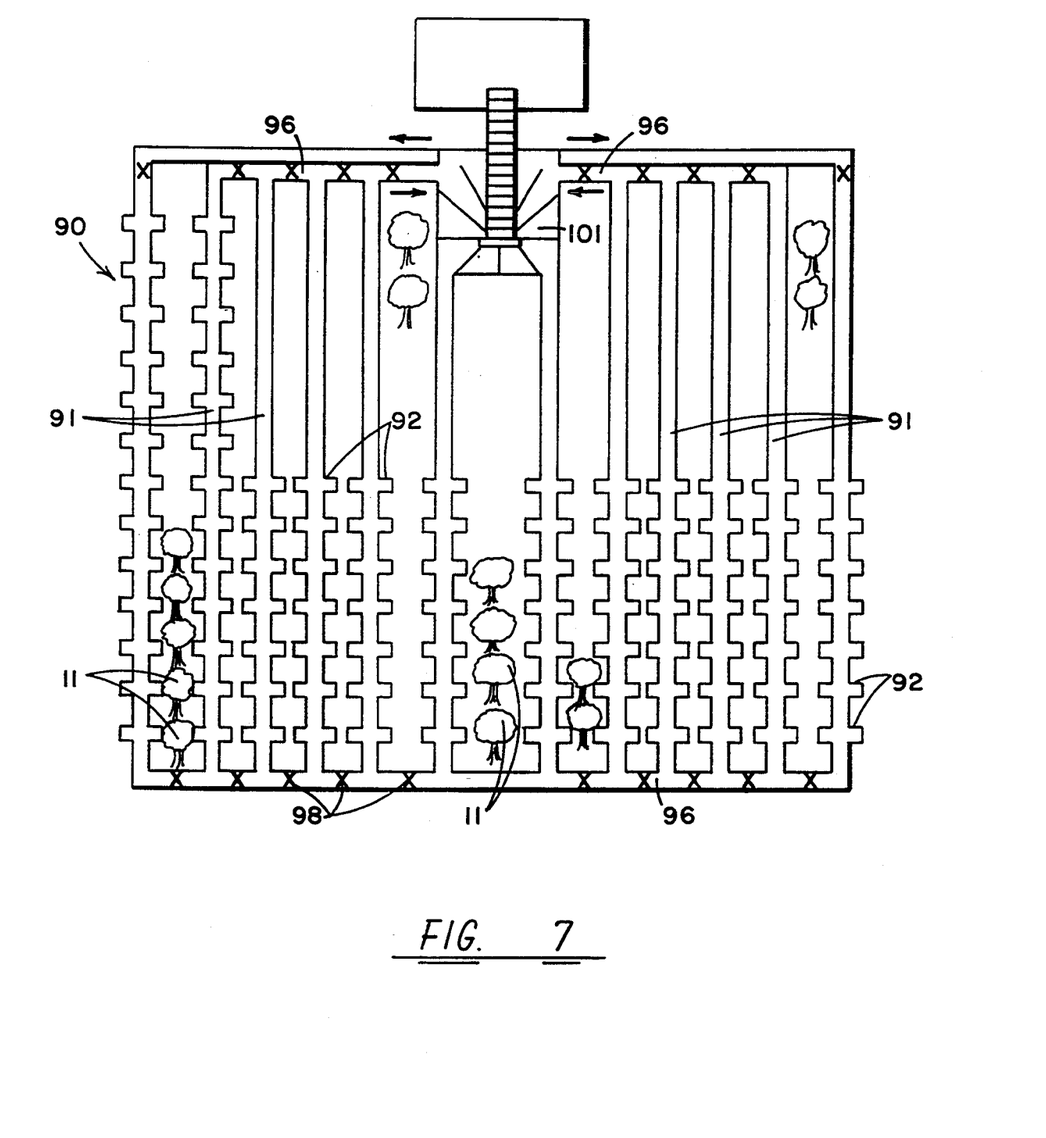
FIG. 7 is a schematic layout view of the piping network of the system of FIGS. 13.
Figure 8:
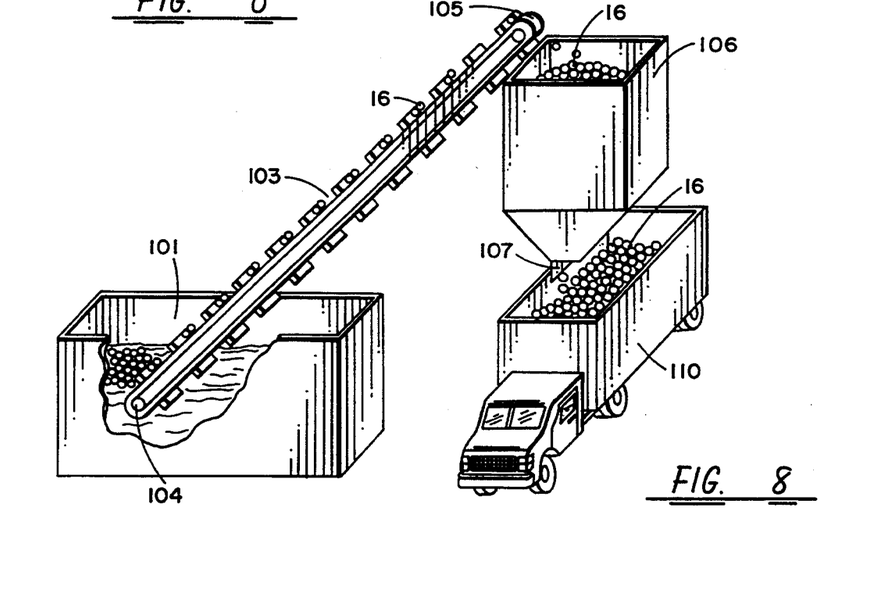
FIG. 8 is a schematic cutaway view of the catch basin of FIG. 7.

In accordance with a further aspect of the crop harvesting system of the invention, an underground piping network 90 (FIGS. 2, 3 and 7) is laid out throughout the grove 10. Longitudinal runs 91 of piping are run centrally below each pathway 14 and are provided with local, laterally diagonally extending feeding branches 92 (FIGS. 2 and 3) which have entrance ports 93 (FIGS. 2, 3 and 6), opening at locations below the discharge openings 88 of the nets 70, and exit ports 94 connecting radially with the interior of the longitudinal runs 91. Covers 95 are provided for insertion through the net openings 88 into the entrance ports 93, to keep unwanted debris out of the network 90 and keep fruit 16 from falling through openings 88, when network 90 is not in operation. Funnel tubes 95, having upper ends matching beveled contours of the inside circumferences of rings 85 and lower ends inserted into the top openings of ports 93, serve to funnel fruit 16 from the openings 88 to the runs 92. Runs 91 are joined at distal and proximal ends to lateral runs 96 (see FIG. 6). Shut-off valves 98 are located in runs 96, between connections with runs 91, to selectively control flow of water 80 through the runs. The proximal lateral runs 96 join a catch basin 101. As shown in FIG. 8, catch basin 101 includes a conveyor 103 having a lower end 104 immersed within water 100 of catch basin 101, and an elevated upper end 105 located above an entrance to a collection hopper 106. A selectively openable discharge chute 107 is located at a lowest point of the hopper 106 at an elevation which enables a crop transporting vehicle 110 to be located thereunder and receive a load of fruit 16 therefrom.

In operation, fruit 16 is released with or without aid of abscission chemicals from trees 11, drops onto grillwork provided by nets 70, and moves down runners 84 under force of gravity to the discharge openings 88 defined by rings 85. Covers 111 of pipe branches 92 have been removed, and gathered fruit 16 drops down through funnels 95, into branches 92 and falls into the water filled longitudinal runs 91. Water 100 is flowed within piping network 90, to carry the fruit 16, which floats, to the proximal lateral runs 96 and into the catch basin 101. Here, conveyer 103 elevates fruit 16 upward and into the top of hopper 106, from whence it is released through discharge chute 107 into a transport truck, open train car, or other vehicle 110 for transportation to a remote processing or distribution center.

As described above, nets 70 are located around and under the trees for catching and channeling the dropped crop, and the grillwork is made pivotable, so that it can be raised out of the way to provide access for spraying of herbicides, or for other care of trees. It will be appreciated, however, that the nets could also be provided as portable units attached to picker 20, in order to be readily moveable with the picker, from tree to tree. This would eliminate the need for permanent netting around each tree and achieve similar fruit gathering advantages with fewer nets. In such case, fruit 16 gathered in net 70 can be emptied into a goat or other receptacle travelling with picker 20, so that the advantages of the described picker can be realized, even in the absence of the described net and piping network systems.

Those skilled in the art to which the invention relates will appreciate that other substitutions and modifications can be made to the described embodiments, without departing from the spirit and scope of the invention as described by the claims below.

What is claimed is:

1. A method for harvesting crops from trees, comprising the steps of:
    separating crop from a tree using a mechanical picker, by advancing a series of rotating disks into the tree;
    letting the separated crop fall onto underlying netting;
    gravitationally moving the fallen crop to a discharge opening in the netting;
    emptying the crop from the discharge opening into an underground network of piping; and
    pumping water through the piping to carry the emptied crop from vicinity of the tree to a catch basin.

2. A method as defined in claim 1, further comprising the step of applying an abscission chemical to the tree for loosening the crop.

3. A method as defined in claim 1, further comprising the steps of elevating the crop from the catch basin to a holding tank hopper; and loading the elevated crop from the hopper onto a vehicle for transportation to a remote location.

4. A method as defined in claim 1, further comprising the step of treating the carried crop with chemical applied to the water.

5. A method as defined in claim 4, wherein, in the treating step, the chemical comprises an anti-fungal substance.

6. A method as defined in claim 1, wherein said tree includes larger and smaller elements of the crop, and wherein said separating step comprises advancing spaced disks through the tree, so that facing surfaces of adjacent disks contact the larger elements and the smaller elements pass through disk spacings.

7. A method as defined in claim 1, wherein said separating step comprises rotating adjacent disks in counter-rotation into the tree.

8. A method as defined in claim 1, wherein the mechanical picker comprises disks mounted on arms having inner and outer portions; and wherein said separating step comprises telescoping the outer portions relative to the inner portions to control penetration into the tree.

9. A method as defined in claim 1, wherein the netting comprises grillwork having spaced runners defining tracks which are oriented downwardly from a framework toward a discharge opening provided in a ring; and wherein, in said moving step, the crop is gravitationally conveyed down the tracks through the ring opening.

10. A method as defined in claim 9, wherein the piping has an entrance port located below the ring opening; a cover is provided through the ring opening into the entrance port; and said method further comprises removing the cover from the ring and entrance port.

11. Apparatus for harvesting crops from trees, comprising, in combination:
    a mechanical picker for separating crop from a tree; said picker including a series of rotating disks, and means for advancing said disks into the tree;
    a netting including a discharge opening; the netting underlying a canopy of said tree and being dimensioned and configured for catching falling crop separated from the tree by the picker, and gravitationally moving the fallen crop to the discharge opening;
    an underground network of piping positioned relative to said netting for receiving the fallen crop from the discharge opening;
    a catch basin connected to the piping; and
    means for pumping water through the piping to carry the crop through the network of piping, from a vicinity of the tree to the catch basin.

12. Apparatus as defined in claim 11, wherein said picker comprises a housing; a plurality of picking disk assemblies, each assembly comprising a pair of longitudinally spaced elongated support arms having inside ends supported on said housing and outside ends, a shaft extending longitudinally between said outside ends, and disks arranged in pairs at longitudinally spaced intervals along said shaft, with adjacent disks of each pair having oppositely facing surfaces.

13. Apparatus as defined in claim 12, wherein said disks are generally elliptical in cross-section, said oppositely facing surfaces are round concave surfaces, and said spaced intervals define hyperbolic cross-sectioned gaps between said facing surfaces.

14. Apparatus as defined in claim 13, wherein said disk surfaces are arrayed with spoke-like radially directed ribs.

15. Apparatus as defined in claim 14, wherein said ribs are rounded, arcuate cross-sectional hard rubber members.

16. Apparatus as defined in claim 11, wherein said netting comprises a pair of longitudinally spaced posts; a framework supported between said posts; a ring having an open interior and being located centrally at a decreased elevation relative to said framework; and a multiplicity of runners extending radially in spaced positions from points of attachment to said framework, to points of attachment to said ring.

17. Apparatus as defined in claim 16, wherein said runners are spaced to provide a grillwork having gaps between runners.

18. Apparatus for harvesting crops from trees, said apparatus comprising:
    a housing having wheels for movement between rows of trees along pathways;
    drive gearing assembly contained within said housing;
    means for driving said drive gearing assembly by a power take-off of a tractor;
    two disk assemblies; each assembly comprising a pair of longitudinally spaced elongated support arms having inside ends supported on said housing and outside ends, a shaft extending longitudinally between said outside ends, and disks arranged in pairs at longitudinally spaced intervals along said shaft, with adjacent disks of each pair having oppositely facing surfaces; and
    said support arms extending laterally through vertical slots in opposite sides of said housing; and said drive gearing assembly being configured for rotating said arms at their inner ends from vertical positions raised above the housing, downwardly through tree canopies toward horizontal positions, and back up to said vertical positions again.

19. Apparatus as defined in claim 18, wherein said picker has a central shaft, four disk assemblies having said arm inner ends mounted at 90-degree angularly-spaced intervals about said central shaft, for rotation in windmill fashion relative to said housing, about a horizontal axis established by said shaft.

20. Apparatus for harvesting crops from trees comprising:
    a plurality of disks arranged on a generally common axis passing centrally through said disks, at least alternating ones of said disks being connected to a drive means for affecting rotation of said at least alternating ones of said disks about said axis; and
    means for supporting and moving said disks into contact with crops on trees whereby rotation of said at least alternating ones of said disks pulls the crops from the trees.

21. The apparatus of claim 20 wherein said at least alternating ones of said disks include a plurality of radially extending, spaced ribs formed on a surface of said disks for capturing the crop.

22. The apparatus of claim 21 wherein said supporting and moving means comprises at least one support arm, said support arm extending from a wheeled carrier and being moveable in at least a vertical direction for passing said disks from a top to a bottom of the trees.

* * * * *